United States Patent Office 3,075,843
Patented Jan. 29, 1963

3,075,843
METHOD OF MAKING SHAPED MEAT PRODUCTS
Russell H. Maas and Floyd C. Olson, Madison, Wis., assignors to Oscar Mayer & Co., Inc., Chicago, Ill., a corporation of Illinois
No Drawing. Filed Oct. 7, 1959, Ser. No. 844,873
6 Claims. (Cl. 99—187)

This invention relates, generally, to innovations and improvements in shaped, whole tissue, cured and heat processed meat products, and methods of producing the same. More specifically, the present invention pertains to methods wherein chunks of whole meat from which excess fat and undesirable tissue have been removed, are packed into a container or form and then heat processed therein so as to become bound together in a composite shape or mass conforming substantially to that of the container.

Primal cuts of meat, e.g. hams, shoulders, loins, etc. have traditionally been cured and subsequently processed in various ways to produce desired meat products for sale and consumption. Primal cuts of meat are inherently non-uniform with respect to weight, shape and composition since no two animals are exactly the same. Furthermore, each primal cut in itself lacks symmetry and complete uniformity in composition. Even so, it has been considered highly desirable to maintain primal cuts intact as much as possible. Due to the lack of uniformity of primal cuts of meat in these and other respects, extreme difficulty is encountered in forming, shaping or pressing cured meat into molds as is required prior to processing if the product is to be sold in sliced or loaf form.

An important object of the present invention is the provision of a method wherein primal cuts of meat, either cured or subsequently cured, are reduced to smaller pieces or chunks, the chunks are trimmed to remove excess fat and/or undesirable tissue as required, the cured chunks are packed in containers or forms and heat processed therein so as to yield products of desired shape and size wherein the individual pieces or chunks are sufficiently bound together to retain the cut appearance of whole muscle meat and undergo slicing without appreciable breaking apart.

Another important object of the invention is the provision of a method whereby cured whole meat trimmings, that is, miscellaneous pieces or chunks of cured unground meat, may be shaped and consolidated by packing and heat processing in containers or forms of various types to provide finished whole meat products which may be sliced without appreciable separating into chunks while retaining the cut appearance of whole muscle meat.

Still another important object of the invention is a method of using chunks or pieces of cured meat so as to produce shaped, whole tissue, cured and heat processed meat products characterized by the following advantages: heavy pressures are not required to fill the forms or containers, thereby facilitating this operation and substantially reducing and simplifying the equipment required and facilitating the cleaning thereof; larger quantities of meat may be packed into a form or container of a given size since there will be substantially no voids; uniform quantities of meat may be packed in a form or container since there will be substantially no voids; more efficient use of the meat product will be realized since there will be less slicing loss as the composite pieces are well bound together and the shaped product is uniform and symmetrical; and, more efficient and complete use of the available whole muscle tissue is permitted since excess fat and internal fat, connective tissue, vascular tissue and other undesirable parts, may be removed.

Another important object of the invention is the provision of improved cured and heat processed meat products in predetermined shapes characterized by uniform sliceability without breaking, reduced content of fat and undesirable tissue, and by a lean, solid muscle meat texture.

Certain other objects of the invention will, in part, be obvious and will in part appear hereinafter.

For a more complete understanding of the nature and scope of the invention, reference may now be had to the following detailed description thereof wherein a number of illustrative examples will be set forth.

The art and science of curing meats have been practiced for untold generations as a means of preserving meat products from one season to another and through adverse conditions from times of plenty of times of need. Basically, meat curing is the process of preserving by the use of salt (i.e. sodium chloride). Many modifications of this basic art are practiced. For example, various sugars may be included in the curing solutions to produce a desirable end product. Sodium nitrite and/or sodium nitrate may be used to produce a pink color in the cured product. In recent years in this country alkaline phosphates have become permissible and useful curing ingredients. With respect to these and other curing agents, the methods of distributing the same throughout the meat are varied. The curing ingredients, which are usually combined or made up into a so-called "cure mix" may be added or applied dry to the surface of meat and permitted to penetrate by dissolution and diffusion. Rubbing hastens this process. The curing composition may be dissolved in water and the meat placed therein and permitted to cure in this manner. In addition to these older methods, more recently methods have been devised for distributing the curing solutions through the vascular system or spraying the solution into the tissues with hollow needles. Depending upon the particular technique used to apply or introduce the curing composition, the length of cure may vary from as much as 90 days in the case of absorption cures to a matter of minutes in the case of injected cures.

Some cured meats after subsequent processing are acceptable to the trade as primal cuts without forming or shaping. For example, smoked hams, picnics, corned beef, bacon, etc. may be sold in the form of processed primal cuts. Other products such as cooked hams (boiled ham), canned hams, various beef cuts, casing hams, etc. are formed in molds, cans or casings after curing and boning. Heretofore, in order to form a meat product and have it assume the shape of the form or container, it has been necessary to maintain substantial pressures on the product during processing. Because of lack of uniformity within the primal cuts, the pressure applied is not uniformly distributed and consequently the finished product will not always (in fact seldom does) completely fill and assume the shape of the form or container. Usually, some parts of the processed product will fall apart on slicing if the lean surfaces have not been firmly pressed together.

For example, a ham is very thin on the shank end, thick in the middle, and medium thick on the butt end. The usual method for cooking a ham is to fold the shank into the bone cavity and cook the product in a form under pressure. A common fault of cooked hams produced in this manner is that the shank pieces and also the butt break loose on slicing, causing a lesser yield. The product in many cases does not completely follow or fill the form cavity with the result that the slices are non-uniform. Another example that may be cited is Canadian bacon. In making this product, two cured strip loins may be held together by stitching or using a casing during processing. The finished product many times does not hold together well and the product has a tendency to break apart on slicing or on frying.

The method provided by the present invention serve largely to eliminate the above-mentioned and other difficulties experienced in forming cured meat products. Primal cuts of meat and/or trimmings may be cut into suitably sized chunks, either before or after curing, and then processed in accordance with the present invention. Any of the known and suitable curing compositions may be used as long as they contain a source of phosphate ions. Preferably the maximum permissible amount of alkaline phosphate is used in the cure mix or composition. A typical and suitable source of phosphate ions is sodium tripolyphosphate. Other alkaline phosphate materials that may be used include, sodium pyrophosphate and sodium hexametaphosphate. The term "chunks" as used herein refers to lean pieces of whole muscle meat which may be obtained either from primal cuts or from trimmings. Desirably, the chunks may range from about ½ to about 3 pounds or more in weight. While smaller pieces may be used, the desirable whole meat texture tends to be interfered with. If larger chunks are used, they are not readily packable into the containers and do not lend themselves to obtaining the full advantages of the invention. Obviously, the size of the chunks selected is somewhat dependent on the type and size of processing form used and the traditional appearance required of the finished product. For example, when larger forms or containers are used, larger chunks may be acceptable. It will be appreciated that either mixtures of chunks of various sizes may be used or, the chunks may be of uniform size and weight.

The term or expression "container" or "container means" is used herein to designate any one of the various types and form of containers that may be selected for receiving the chunks of cured whole muscle meat for heat processing in accordance with this invention. For example, the containers may be tin cans which are sometimes referred to as "rigid metal containers." They may be sausage casings, either natural casings or synthetic casings. The containers or container means may also take the form of so-called "forms" or "cooking forms" such as have been widely used by the packing industry in the production of cooked hams.

The present invention is generally applicable or useful in connection with various types of meat or sources of meat. However, for practical purposes, the main types of meat that will be used are pork and beef and the invention will be illustrated in connection therewith. The invention pertains to cured, whole muscle meats as distinguished from ground or comminuted meat. When the meat is pork the cured forms are generally referred to as ham including various types thereof.

In practicing this invention, the meat may be cured either while still in the form of primal cuts, or it may be cured after the primal cuts and/or trimmings have been suitably chunked. Excess outer fat and undesirable internal fat, connective tissue, vascular tissue and other undesirable parts of the meats may be removed before or after curing. The method of curing may be any one of the above mentioned known methods.

The cured chunks of whole meat are packed in any suitable manner, either by hand or machine, into containers so as to fill the same. The resulting body of meat is then heat processed, e.g. pasteurized, in known manner, whereupon the adjoining pieces of meat become bonded together or attached to one another at the interfaces so that the contents of each container form a substantially single unitary meat body conforming to the shape of the interior of the container.

It will be seen that since each container may be completely filled or packed, it is possible to obtain substantially uniform weights of the finished product, from can to can. Since the containers are completely filled so that there are no voids, the resulting product will take the configuration or shape of the container or form cavity. By reason of the presence of the phosphate ions in the curing composition, there is imparted to the pieces of meat, or more specifically, to adjoining pieces of whole meat or muscle tissue, the tendency and ability to become bonded together during heat processing. Upon removal from the containers in the case of rigid containers such as metal cans, or upon being sliced when the containers are sausage casings, the heat processed or cooked meat products slice up into the uniform slices without separation of the chucks or breaking apart. Hence, the slices are uniform and loss due to breaking away is substantially eliminated.

When the heat processing is carried out in meat forms, only small pressures are required and this constitutes an important advantage. For one thing, the forms can be lightened and greatly simplified. They can be made less expensive and more sanitary. In addition, less labor is required in filling and handling the forms.

A further advantage resulting from the practice of the present invention is the reduction of cooking loss, this being materially reduced from the normal expected losses usually experienced.

The following specific examples will serve further to illustrate the invention and suggest other examples to those skilled in the art.

*Example 1*

Fresh pork hams were trimmed reasonably free of skin and heavy fat on the outside. A curing composition comprising a solution containing 15 parts sodium chloride, 2 parts sugar, 5 parts sodium tripolyphosphate, 0.1 part sodium nitrate, and 0.1 part sodium nitrite was prepared by adding these constituents to 77.8 parts of water. The resulting curing solution was then pumped through the vascular system of the hams using a hollow needle inserted in the femoral artery, and sufficient curing solution was introduced to produce approximately a 10% increase in weight of the hams. The pumped hams were held in a cooler for five days at approximately 38° F. during which time they were covered with additional quantities of the above curing solution. At the end of the five days, constituting the cure time, the hams were removed from the cooler, washed with water to remove excess curing ingredients on the surface of the meat and then they were cut into angular chunks. That is, the chunks were cut generally across the grain instead of parallel to it. Insofar as was conveniently practical, the chunks were cut into pieces ranging from about one-half to about three pounds in weight. During the chunking, and afterwards as convenient, excess fat and undesirable tissues were removed from the chunks.

The resulting chunks of cured ham were then packed in conventional pear-shaped tin cans holding 7 pounds each. The packing was carried out by weighing out 7 pounds into each can so as to completely fill the same. The filled cans were then closed and heat processed or pasteurized in the usual manner. That is, they were put in a hot water bath and held until the internal temperature reached 152° F., taking approximately 6 hours in water at 165° F. On removal from the cans after cooling the solid bodies of cured ham could be sliced and fried without breaking or falling apart.

*Example 2*

Miscellaneous trimmings that were produced incidental to the preparation of primal cuts of pork on the cutting floor were used in this example. The trimmings from hams, shoulders, bellies and loins were trimmed so as to be reasonably free of fat and reduced to chunks weighing from about one-half to three pounds. Undesirable tissues were removed during the chunking operation. The chunks were introduced into 50 gallon containers containing sufficient quantities of the curing solution set forth in Example 1 so as to completely cover the chunks and were held in this condition for seven days to permit the chunks to cure by absorption of the curing salts. At the end of the curing time the cured chunks were removed from the containers and washed so as to remove excess curing salts from the surfaces. The chunks were then packed into spring-loaded forms of known type conventionally used for producing cooked or boiled hams. The filled forms were then processed in hot water at 165° F. in the usual way until the internal temperature reached 152° F. In each instance the forms were filled with a uniform weight of the cured chunks. As a result of the curing operation the individual chunks became bonded or secured to one another so as to form a unitary body which could be removed from the forms and then canned in the usual manner.

*Example 3*

Primal cuts of beef (commercial ham sets consisting of outsides, insides and knuckles) were trimmed to remove tendons and connective tissue, and heavy external fat. The same were then sprayed with a curing composition comprising, 15%, by weight, salt, 2% sugar, 2.5% sodium tripolyphosphate, 0.1% sodium nitrite, 0.1% sodium nitrate, 0.8% spice oils and extractives, and 79.5% water. This curing solution was sprayed or introduced into the primal cuts by means of a device consisting of a plurality of hollow needles with sufficient curing solution being used to increase the weight of each primal cut approximately 20%. The sprayed or pumped primal cuts of beef were then introduced into containers and sprinkled with a mixture of curing salts in the above-mentioned proportions and held in a cooler for 7 days. At the end of this time the primal cuts were removed from the cooler and washed with water so as to remove the curing ingredients from the exterior surfaces. The cured primal cuts were then cut into angular chunks weighing from approximately ½ to 3 pounds in weight. Excess fat, both external and internal and undesirable connective tissues were removed from the chunks and in forming the chunks. The chunks were then introduced into rectangular tin cans so that each was substantially completely filled with a uniform quantity of the cured meat chunks. The cans were sealed and then heat processed in a water bath until the internal temperature reached 152° F., which required 5 hours at a water temperature of 165° F.

After cooling, the cans were opened and the contents removed in the shape of a rectangular loaf of whole meat of substantially uniform texture and cross section. The loaves of beef did not break or crumble apart on slicing.

*Example 4*

Chunks of uncured pork weighing from about ½ to 3 pounds each were obtained from primal cuts of pork and pork trimmings. These chunks were cured as described above in connection with Example 2. The cured chunks were weighed out into lots of 12 pounds and then introduced into casings each 34 inches long and 4 inches in diameter, the filled casings were tied off at the ends and the heat processed in a conventional smokehouse at 180° F. until internal temperatures of 152° F. were reached in the cans. The resulting products were refrigerated and then sliced, without breaking, into round slices each presenting uniform, whole meat texture.

In the foregoing examples the sodium tripolyphosphate may be replaced with equal amounts of sodium pyrophosphate or sodium hexametaphosphate. If desired the potassium salts may be used instead of the sodium salts.

As mentioned, excess fat should be removed from the chunks before packing into containers and heat processing. However, the chunks do not have to be completely free of fat, it only being necessary that the surfaces of the chunks be predominantly lean meat.

It will be obvious to those skilled in the art that a number of variations may be introduced in the foregoing examples. For example, different curing compositions may be used as long as there is always present a sufficient source of phosphate ions. As above mentioned, it has been found that the phosphate ions must be present in order to permit the pieces of muscle or whole tissue to become bonded or joined.

We claim:
1. In the method of manufacturing a shaped, whole tissue, cured and heat processed meat product, the steps which comprise, packing chunks of lean whole muscle meat weighing from about ½ pound to about 3 pounds each and cured with a curing composition containing a source of phosphate ions into container means so as to substantially completely fill the same and heat processing the contents of said container means therein whereby said chunks become attached to one another to form a substantially integral, one-piece whole tissue, meat body within said container means having the shape of the interior thereof and which upon slicing does not come apart.

2. In the method of manufacturing a shaped, whole tissue, cured and heat processed meat product, the steps which comprise, packing chunks of lean whole muscle meat weighing from about ½ pound to about 3 pounds each and cured with a curing composition containing a source of phosphate ions into a can so as to substantially completely fill the same and heat processing the contents of said cans therein whereby said chunks become attached to one another to form a substantially integral, one-piece whole tissue, meat body within said can having the shape of the interior thereof and which upon slicing does not come apart.

3. In the method of manufacturing a shaped, whole tissue, cured and heat processed meat product, the steps which comprise, packing chunks of lean whole muscle meat weighing from about ½ pound to about 3 pounds each and cured with a curing composition containing a source of phosphate ions into a sausage casing so as to substantially completely fill the same and heat processing the contents of said casing therein whereby said chunks become attached to one another to form a substantially integral, one-piece, whole tissue, meat body within said casing having the shape thereof and which upon slicing does not come apart.

4. In the method of manufacturing a shaped, whole tissue, cured and heat processed meat product, the steps which comprise, packing chunks of lean whole muscle meat weighing from about ½ pound to about 3 pounds each and cured with a curing composition containing a source of phosphate ions into a spring-loaded form so as to substantially completely fill the same and heat processing the contents of said spring-loaded form therein whereby said chunks become attached to one another to form a substantially integral, one-piece, whole tissue, meat body within said form having the shape of the interior thereof and which upon slicing does not come apart.

5. In the method of manufacturing a shaped, whole tissue, cured and heat processed ham product, the steps which comprise, packing chunks of lean whole ham weighing from about ½ pound to about 3 pounds each and cured with a curing composition containing a source of phosphate ions into container means so as to substantially completely fill the same, and heat processing the contents of said container therein whereby said ham chunks become attached to one another to form a substantially integral, one-piece, whole tissue, ham body within said container means having the shape of the interior thereof and which upon slicing does not come apart.

6. In the method of manufacturing a shaped, whole tissue, cured and heat processed beef product, the steps which comprise, packing chunks of lean whole muscle beef weighing from about ½ pound to about 3 pounds each and cured with a curing composition containing a source of phosphate ions into container means so as to substantially completely fill the same, and heat processing the contents of said container therein whereby said beef chunks become attached to one another to form a substantially integral, one-piece, whole tissue, beef body within said container means having the shape of the interior thereof and which upon slicing does not come apart.

References Cited in the file of this patent

UNITED STATES PATENTS

| | | |
|---|---|---|
| 2,037,892 | Gleason | Apr. 21, 1936 |
| 2,182,891 | Eikel | Dec. 12, 1939 |
| 2,305,480 | Komarik | Dec. 15, 1942 |
| 2,331,467 | Griffith et al. | Oct. 12, 1943 |
| 2,596,067 | Brissey | May 6, 1952 |
| 2,812,261 | Wasserman | Nov. 5, 1957 |
| 2,824,809 | Schoch | Feb. 25, 1958 |
| 2,852,392 | Huber et al. | Sept. 16, 1958 |
| 2,888,351 | Olson et al. | May 26, 2959 |
| 2,903,366 | Barnett | Sept. 8, 1959 |
| 2,937,094 | Rupp | May 17, 1960 |